United States Patent
Kamenka et al.

(10) Patent No.: US 9,558,450 B2
(45) Date of Patent: Jan. 31, 2017

(54) SYSTEM FOR RECOMMENDING HELICOPTER ENGINE MAINTENANCE

(75) Inventors: Alexandre Kamenka, Ondres (FR); Serge Maille, Ondres (FR); Francois Prat, Anglet (FR); Jean-Louis Boucon, Nay (FR); Nadir Debbouz, Port de Lanne (FR); Jean-Stéphane Vignes, Anglet (FR); Marie-Caroline Dumez-Vinit, St Jean de Marsacq (FR); Francois Faupin, Bayonne (FR); Antoine Blay, Tarnos (FR); Didier Vieillard-Baron, Dax (FR); Ludovic Boutin, Labenne (FR); Philippe Boureau, St Pee de Bigorre (FR); Christophe Gaultier, Bayonne (FR); Hélène Mestdagh, Jatxou (FR); Nicolas Nuffer, Biarritz (FR); Fabien Lamazere, Ciboure (FR)

(73) Assignee: TURBOMECA, Bordes (FR)

( * ) Notice: Subject to any disclaimer, the term of this patent is extended or adjusted under 35 U.S.C. 154(b) by 342 days.

(21) Appl. No.: 14/125,227

(22) PCT Filed: Jun. 19, 2012

(86) PCT No.: PCT/EP2012/061754
§ 371 (c)(1),
(2), (4) Date: Mar. 14, 2014

(87) PCT Pub. No.: WO2012/175521
PCT Pub. Date: Dec. 27, 2012

(65) Prior Publication Data
US 2014/0207726 A1    Jul. 24, 2014

(30) Foreign Application Priority Data
Jun. 20, 2011 (EP) .................................... 11305774

(51) Int. Cl.
*G06N 5/04* (2006.01)
*G06Q 10/06* (2012.01)

(52) U.S. Cl.
CPC .............. *G06N 5/048* (2013.01); *G06Q 10/06* (2013.01)

(58) Field of Classification Search
None
See application file for complete search history.

(56) References Cited

U.S. PATENT DOCUMENTS 5,210,704 A * 5/1993 Husseiny ............... G01H 1/003
702/34
6,170,742 B1 * 1/2001 Yacoob ................ G06Q 20/341
235/375

(Continued)

OTHER PUBLICATIONS

European Patent Office, International Search Report for Corresponding International Application No. PCT/EP2012/061754 mailed Sep. 11, 2012 in the French and Englsh languages (4 pgs).

*Primary Examiner* — Alan Chen
(74) *Attorney, Agent, or Firm* — Harris Beach PLLC (57) ABSTRACT

The invention relates to a system for recommending maintenance of helicopter engines depending on the technical condition of the engine, the standard replacement of parts between engines, and the replacement of parts with different parts. The system comprises: a centralized database storing data relating to (i) working condition and working condition indicators, (ii) modifications of the engines, (iii) maintenance plans for the engines, (iv) causes of unscheduled events, (v) maintenance applied to the engines, and (vi) instantiated configurations; means for acquiring the working condition indicators and for updating the working condition data; means for identifying maintenance to be applied to the engines depending on the data; means for generating an alarm for identified maintenance to be performed; means for (Continued)

the digitally-signed updating of the applied maintenance and configuration data according to maintenance operations; and means for deactivating an alarm once the maintenance associated with the alarm is completed.

11 Claims, 4 Drawing Sheets

(56) References Cited

U.S. PATENT DOCUMENTS

| | | | |
|---|---|---|---|
| 7,526,405 B2* | 4/2009 | Miller | G05B 23/024 |
| | | | 382/144 |
| 2004/0044499 A1* | 3/2004 | House | H02P 29/02 |
| | | | 702/181 |
| 2005/0096873 A1* | 5/2005 | Klein | G01H 1/006 |
| | | | 702/184 |
| 2008/0034257 A1 | 2/2008 | Hilderscheid | |

\* cited by examiner

SYSTEM FOR RECOMMENDING HELICOPTER ENGINE MAINTENANCE

CROSS-REFERENCE TO RELATED APPLICATIONS

This application is a national stage application under 35 U.S.C. §371 of PCT Application No. PCT/EP2012/061754, filed Jun. 19, 2012, which claims priority to and the benefit of European Application No. 11305774.9 filed on Jun. 20, 2011, which are incorporated herein by reference in their entirety.

FIELD OF THE INVENTION

The invention relates to helicopter engines, and more specifically to the maintenance thereof.

STATE OF THE ART

A helicopter engine is a so-called "critical" system, with a very high variability of its components, parts, and functional assemblies of parts.

First, like any mechanical system, each of the parts and of the functional assemblies of parts, or "modules", is submitted to wearing, to fouling, to the aging of lubricants, etc. or more generally submitted to a modification of their characteristics which makes them drift from their desired behavior. In the case of a helicopter engine, technical constraints to ensure the safety of flights are such that both the number of maintenance operations and the maintenance frequency are high, and especially much higher than the number of maintenance operations and the maintenance frequency of airplane engines, for example.

Then, for a same engine definition, the working conditions are much more variable than for an airplane engine. While an airliner engine typically performs a line flight with 90% of its flight time in cruise mode with stable and constant parameters, a same class of helicopter engines may be used to perform missions with a great variety of stress: load slinging missions successively and repeatedly requiring a high power and carried out close to the ground, and thus to the dust and other aerosols, passenger transport missions with a significant cruise phase at a high altitude, sea rescue missions with significant times of exposure to saline fog, combat missions, with a most highly variable profile . . . .

Then, helicopter engine constructors carry out constant research on such systems to improve their performance. Thus, the constructor of a helicopter engine may prescribe up to hundreds of modifications for an engine, especially modifications of the characteristics of parts. For example, the number of prescriptions to modify Turbomeca's "ARRIEL" helicopter engines is now greater than 300, which amounts to a number of theoretically possible configurations greater than $2^{300}$ for an engine of this class, although, among possible configurations, only given ones, define by strict rules of implication and/or exclusion between modifications, are allowed to navigate. Indeed, an engine is a highly-optimized system, due to its design constraints, substantially more than an airplane engine, for example. As an example, an "ARRIEL" engine delivers a 700 horsepower for a 109-kg weight, which result is obtained by optimizing in the extreme each part and each module with respect to one another. Thereby, even though the constructor may issue modification prescriptions, this does not mean that said modifications are necessarily implemented by the user of an engine. It can besides be observed that each engine has a configuration which is generally specific thereto and clearly different from the configuration of other engines of the same class.

Thus, a helicopter engine is a critical system, with highly-interdependent elements which may take a very high number of possible configurations, and submitted to a number of maintenance operations which is also high, which directly impact the engine performance and safety, at the very least disproportionately as compared with other types of commercial engines, including airliner engines.

A human maintenance operator cannot manage such a complexity with all the details to be integrated. Thus, the deployed maintenance concepts have level-1 and 2 maintenance operators work on a simplified and synthetic model of the engine working conditions and configuration: working conditions parameters are by a limited number (typically from two to three parameters) and the configuration management is limited to the first stages of the nomenclature by decreasing the number of modifications visible at level 1 and 2. To ensure the safety of flights whatever the engine operating conditions (which cannot be reflected in detail by the synthetic parameters), significant security margins are applied to the maintenance prescriptions. Thus, the maintenance of a helicopter engine is actually significantly sub-optimal, and further possibly non-constant since it essentially depends on the skill of the different maintenance operators working on the engine.

DISCUSSION OF THE INVENTION

The present invention aims at providing a maintenance prescription system which takes into account the complexity of the maintenance already applied, the in-flight operating conditions, and the specific engine configuration to determine maintenance operations for a helicopter engine.

For this purpose, the invention aims at a system for prescribing maintenance of helicopter engines belonging to the same engine class and formed by elements that vary over time depending on the technical condition thereof, the standard replacement of parts between engines, and the replacement of parts with different parts, comprising:
  a centralized database storing operational data relating to:
    working condition, describing the history of one or more working condition indicators of each of the engines,
    possible modifications and authorized modifications of the engines;
    the definition of maintenance plans for the engines according to predetermined values of the working condition indicator(s);
    the description of the probable causes of unscheduled events according to the data relating to possible and authorized modifications and the working condition data;
    maintenance applied, describing the nature and history of maintenance operations applied to each of the engines; and
    instantiated configurations, describing the nature and the history of the configuration modifications applied to each of the engines; and
  means for acquiring the working condition indicator(s) of each of the engines and for updating the working condition data depending on the acquired value of the indicator(s) of each engine;
  means for identifying a maintenance operation to be applied to each of the engines depending on the operational data in the database;

means for generating a continuous alarm for each identified maintenance operation to be performed;

means for the digitally-signed updating of the applied maintenance data and the instantiated configuration data according to each maintenance operation applied to each of the engines; and means for deactivating an activated alarm if at least the digitally-signed update of the data resulting from the identified applied maintenance operation associated with the alarm is carried out.

"Operational working condition data" means objective data describing the conditions to which the engines have been submitted in flight or on ground during their operation and based on which a decision is taken to service the engines. As an illustration, a piece of working condition data is the number of hours of flight of the helicopter, an overhaul of the helicopter engine being for example performed every 3,000 hours of flight.

"Operational data relating to possible engine modifications" designate data describing all the modifications, or configurations, which are possible on engines belonging to a same class.

"Operational data relating to authorized engine modifications" designate data describing all the authorized or "navigable" configurations from among the possible configurations of engines belonging to a same class.

"Operational maintenance plan definition data" designates data describing all maintenances which are predictably triggered for an engine of a same class, independently from their specific configurations, based on the value of the working condition indicator(s) of the engines.

"Operational data of description of the probable causes of unscheduled events" designates data describing probable causes, preferably with associated probabilities, of unscheduled events occurring on the engines, especially failures.

"Maintenance operation" here designates an action taken on an engine, of whatever nature. Maintenance operations gather actions of engine failure assistance and repair, setting, overhaul, control, and checking.

"Operational data relating to maintenance applied" here designates data describing all the maintenance operations implemented on the engines.

"Operational data relating to instantiated configurations" here designates the data describing the specific configurations of engines following configuration modifications after, for example, modification prescriptions by the constructor.

First, the system according to the invention plots all the data of all the engines belonging to a same class, which allows a specific follow-up of each engine.

Further, all the data associated with a specific engine form an "Electronic Engine Logbook" which contains the history of all the maintenance operations applied to the engine, the working condition operational data, as well as the specific configuration thereof, and replaces the handwritten engine logbook. The analysis of the flight indicator(s), as well as the maintenance prescriptions, are thus performed based on these data, which contain the history of all the maintenance operations applied to the engine, the in-flight or ground operating conditions as well as the history of all configurations, which thus enables to take into account the complexity of the maintenance of a helicopter engine. Further, the history of the data also enables to implement tendency analyses, and thus to correct and/or to improve, particularly, the data of definition of the maintenance plan and of definition of the causes of unscheduled events.

Then, the system implements an alarm activation/deactivation system. An alarm is activated at least for each maintenance operation to be immediately performed on an engine. The use of alarms aims not only at warning the maintenance operator that a maintenance operation should be performed on an engine, but above all at forcing the operator to update the database, which ascertains that the data in the base are always complete and relevant. More specifically, the system according to the invention plays the role of paper maintenance logbooks, which forces maintenance operators to necessarily use the system and thus to update it. The combination of the technical alarm management and of the legal obligation of use of the system thus provides the technical effect of a complete database.

According to a variation of the system, the alarm also blocks any action on the system relative to engines for which an alarm has been activated, as long as the corresponding procedures of deactivation by updating of the data have not been carried out.

The invention also aims at a method of prescribing maintenance of helicopter engines belonging to the same engine class and formed by elements that vary over time depending on the technical condition thereof, the standard replacement of parts between engines, and the replacement of parts with different parts, comprising:

storing operational data relating to:
working condition, describing the history of one or more working condition indicators of each of the engines,
possible modifications and authorized modifications of the engines;
the definition of maintenance plans for the engines according to predetermined values of the working condition indicator(s);
the description of the probable causes of unscheduled events according to the data relating to possible and authorized modifications and the working condition data;
maintenance applied, describing the nature and history of maintenance operations applied to each of the engines; and
instantiated configurations, describing the nature and the history of the configuration modifications applied to each of the engines; and acquiring the working condition indicator(s) of each of the engines and updating the working condition data depending on the acquired value of the indicator(s) of each engine;

identifying a maintenance operation to be applied to each of the engines depending on the operational data in the database;

generating a continuous alarm for each identified maintenance operation to be performed;

updating with a digital signature the applied maintenance data and the instantiated configuration data according to each maintenance operation applied to each of the engines; and deactivating an activated alarm if at least the digitally-signed update of the data resulting from the identified applied maintenance operation associated with the alarm is carried out.

BRIEF DESCRIPTION OF THE DRAWINGS

The present invention will be better understood on reading of the following description provided as an example only in relation with the accompanying drawings, where.

DETAILED DESCRIPTION

Figure 1:
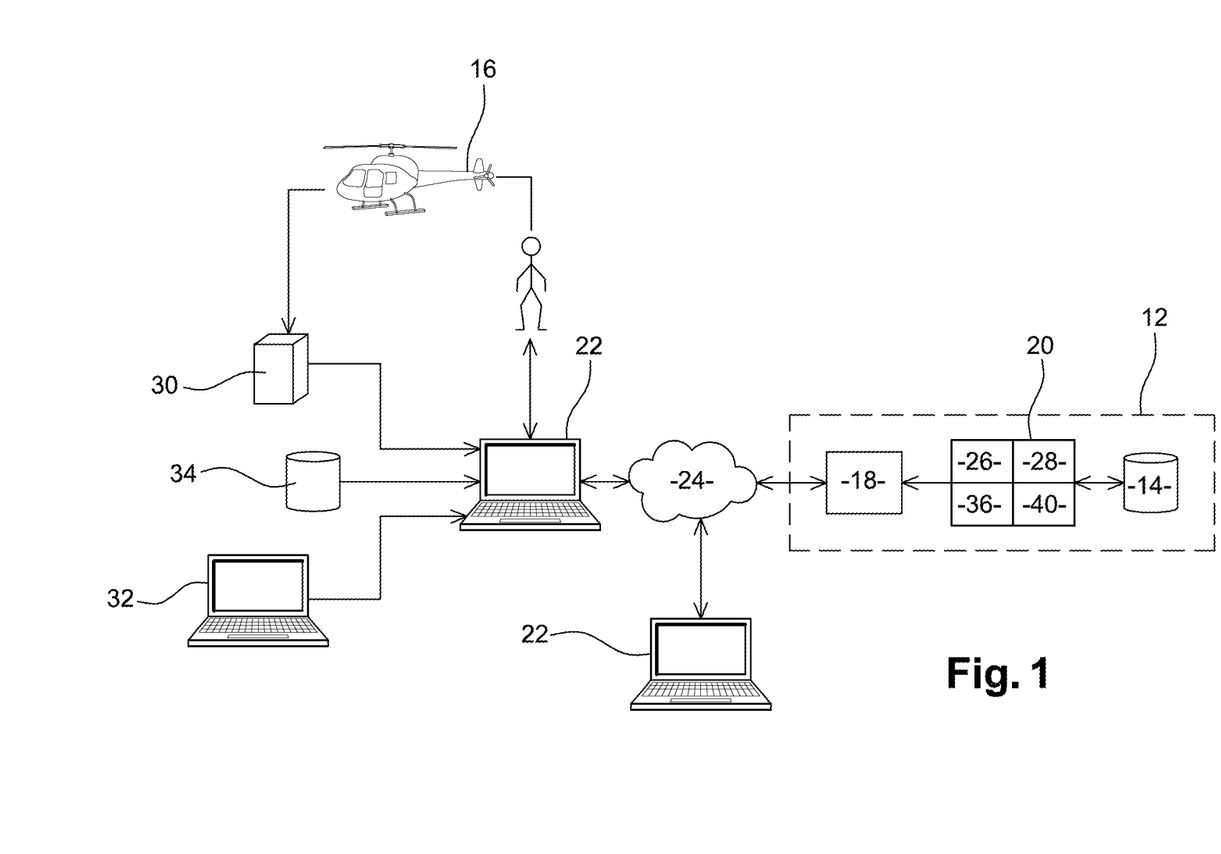
FIG. 1 is a simplified view of a maintenance prescription system according to the invention.

In FIG. 1, a maintenance prescription system according to the invention is illustrated under general reference numeral 10. System 10 comprises a central server 12 implementing a database 14 gathering data relative to engines of a helicopter fleet 16, a software unit 18 managing the access to server 12 and the safety thereof, and software units 20 for processing the data contained in base 14.

Database 14 gathers all the data of the engines in the fleet allowing a continuous follow-up of the navigability of these engines, and thus allowing to prescribe maintenance operations thereon, particularly according to their specific configurations and to the history of the operations applied thereto.

The access to central server 12 is performed by any computer means 22 available for users, office computers, laptop computers, tablets, "smartphones", or others, via one or several telecommunication networks 24, for example, the Internet, local networks, virtual private networks, etc. As opposed to central server 12, computer means 22 available for a user are called "local station".

Preferably, a local station 22 comprises a software unit implementing, with access and security management unit 18, a software architecture of web client/server type, thus allowing a connection with central server 12 via a single web portal for all users.

The connection to central server 12 is performed by authentication, the user desiring to connect to central server 12 having an account thereon, to which it accesses by keying in at least a login and a password.

Access management and security unit 18 further implements functions of security and confidentiality of the connections with server 12, particularly antivirus, anti-intrusion, anti-aspiration, abnormal traffic inspection, and other functions, and traces each connection and each action performed via central server 12 on database 14. Further, each user account is associated with specific privileges according to the user's nature (maintenance operator, engine owner/lessor organization, engine constructor, etc.), these privileges defining the type of action that the user can undertake on database 14 and the type of data in base 14 to which the user has access.

Different authentication levels may further be implemented according to a user's privileges. Advantageously, for privileges bearing on a modification of the data of base 14, a strong authentication based on a digital or electronic signature is required.

Database 14 particularly comprises operational data relating to:

- the working condition, describing the history of one or several indications of the working condition of each of the engines, such as for example, the number of hours of flight or the number of cycles of each of the engines. The number of cycles is an indicator describing the number of times that the speed of an engine integrally describes a given speed range during a flight. A working condition indicator may also comprise flight conditions of a helicopter impacting the working condition of an engine, such as for example a flight in a sandy, salty, or other environment;
- possible modifications and authorized modifications of the engines. Advantageously, database 14 comprises not only the authorized, or "navigable", engine modifications, but also all possible engine modifications. The authorized configurations can be deduced from the strict rules of implication and/or exclusion. This enables to compare a specific engine configuration, which may be a possible but non-authorized configuration, for example, due to a maintenance error, with authorized configurations. Configuration modification errors can thus be detected;
- the definition of maintenance plans for the engines according to predetermined values of the working condition indicator(s). For example, this concerns maintenance operations to be applied every X hours of flight of the engines, or when the number of cycles of an engine exceeds a predetermined threshold value, or when an engine has been flown in a specific environment, etc.;
- the description of the probable causes of unscheduled events, and especially of failures, according to the data relating to possible and authorized modifications and to the working condition data. Preferably, the description data are organized in the form of a probability tree according to the possible engine modifications, as will be explained in further detail hereafter:
- maintenance applied, describing the nature and history of maintenance operations applied to each of the engines; and
- instantiated configurations, describing the nature and the history of the configuration modifications applied to each of the engines.

Database 14 also comprises operational data describing the operation protocol of each maintenance operation, that is, what a maintenance operator should do to properly carry out the maintenance operation, for example, in the form of reference technical documentation.

Because maintenance plan definition data, the data defining probable causes, and operational data are capable of varying over time (updates, optimization of maintenance plans, of operating modes, improved identification of failure causes, etc.), database 14 comprises all versions of these data, and particularly all versions of the reference technical documentation, as well as the timestamping of said versions, that is, the period during which they were used in maintenance and configuration modification operations, to associate each applied operation and modification performed with a version of the data.

The database also comprises a set of time signatures characteristic of events, and especially of failures, with which are compared the working condition indicators stored in base 14, especially to determine unscheduled events on the engines, and thus trigger a maintenance operation, as will be explained in further detail hereafter.

Software processing units 20 comprise a first unit 26 of electronic consultation of data from base 14 enabling to interactively display them in the form of maintenance manuals, or troubleshooting manuals, of spare parts catalogues, of tooling catalogues, of newsletters issued by the constructor, especially concerning changes of configuration or other, and this, for each family, or class, of engines managed by system 10. The access to this documentation is managed by consultation unit 26, preferably according to the privileges assigned to the users, to the instantiated configuration of the engines, or any other criterion of interest.

Software processing units 20 comprise a second unit 28 for processing data generated during a flight, commonly called "flight data", unit 28 enabling to collect the engine working condition indicators, to process them and to incorporate them into database 14.

More specifically, processing unit 28 comprises a first sub-unit for collecting working condition indicators. The indicators and other flight data are collected by central server 12 from different acquisition channels, and especially from flight recorders 30, from manual input means 32, for example, for engines which are not equipped with embarked recorders, and from other computer systems 34, which for example collect said data first. The collection is preferably supervised by a user from his local workstation 22, so that he can view them and, if need be, modify them, before their downloading onto central server 12.

Unit 28 further comprises a second sub-unit for validating and saving the collected data. The second sub-unit verifies the consistency of the collected data before they are saved in base 14. In particular, the second sub-unit verifies the conformity of the data format with one or several formats required for these data, verifies that the data are not corrupted during the transmission, for example, by means of a data exchange between central server 12 and local station 22 to verify the integrity of the collected data. In case of a lack of consistency of the data, an alarm signal is emitted for sub-unit 28.

A sub-unit for pre-processing the collected data may also be provided, for example, to generate composite working condition indicators from the working condition indicator values downloaded into central server 12. Further, the values of the indicators, which are a synthesis of the working condition of an engine, may be generated by calculation, for example, according to raw flight data continuously or regularly recorded during a flight. Optionally, the raw flight data may be directly downloaded into central server 12 and the pre-processing sub-unit implements the calculations generating the values of the indicators.

Software units 20 also comprise a third maintenance prescription unit 36 which is executed once new values of the indicators of the working condition of an engine have been recorded in database 14, or independently from a new data collection, by order of an authorized user. Particularly, the last values of the engine working condition indicators are compared with predetermined values defined in the operational maintenance plan data, to determine whether a maintenance operation should be applied to the engine. Maintenance plans especially correspond to maintenance operations predictable according to the current value of the working condition indicators. For example, a maintenance operation is executed every X hours of flight.

However, since database 14 contains the history of the working condition indicators, the history of the configuration modifications, and the history of the maintenance operations applied to each engine, it is possible to implement more complex tests than a simple comparison of a value with a triggering threshold to determine whether a maintenance operation should or not be applied. In particular, an analysis of the tendency of working condition indicators may be implemented by unit 36 since the variation of said indicators over time is known, with the possibility of weighting or not such analyses with the instantiated engine configurations and/or the maintenance operations already applied thereto.

When a maintenance operation to be applied to an engine is identified, an alarm signal is emitted by third unit 36.

Further, third unit 36 identifies according to the instantiated engine configuration, and optionally according to the maintenance operations already applied thereto, the data describing the operation protocol to be implemented in order to carry out the identified maintenance operation, such data being made available to the maintenance operator in charge of said operation.

Figure 2:
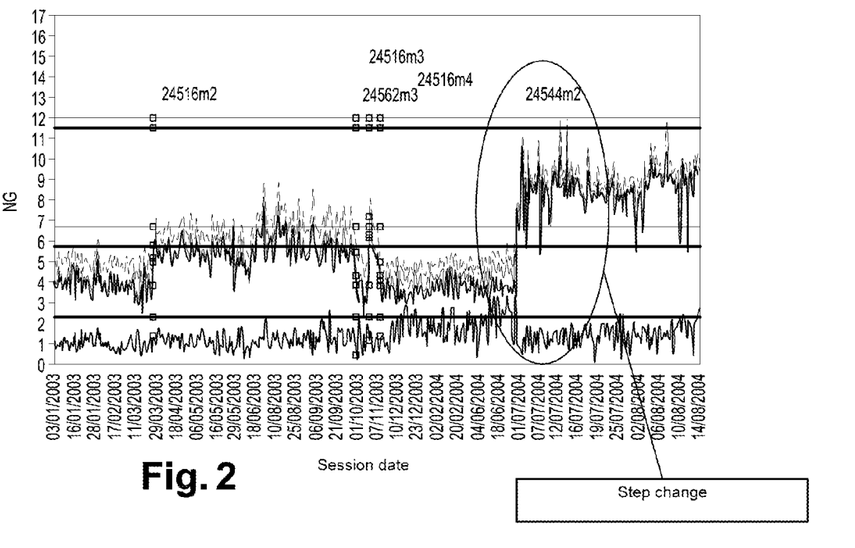
FIG. 2 is a plot of a first indicator of the working condition over time stored in the database of the system according to the invention.
Figure 3:
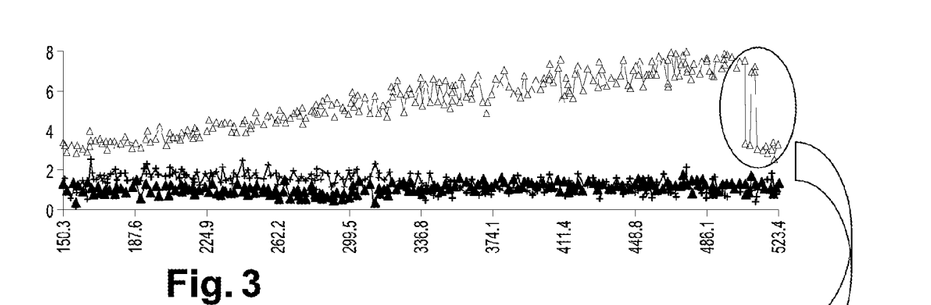
FIGS. 3 and 4 respectively are plots of a second working condition indicator stored in the database and of its time drift.

Third unit 36 is also configured to determine whether non-predictable events have occurred. Particularly, the working condition indicators stored in database 14 are compared with the base of time signatures characteristic of events triggering maintenance operations. It is for example known that some indicators adopt a limited variation of their value during a normal engine operation, as illustrated, for example, in FIGS. 2 and 3 which illustrate abrupt changes of the value of a working condition indicator. A comparison of the time variation of these indicators with a variation profile considered as abnormal thus enables to determine that a maintenance operation is likely to have to be applied in addition to the predictable operations prescribed in maintenance plans.

When the comparison with the signature base is positive, an analysis is carried out by third unit 36 on the applied maintenance operational data and on the instantiated configuration data to find out whether a previous action on the engine can explain the abnormal variation of the concerned working condition indicator(s). For example, an abrupt increase of the indicator of FIG. 2 can be explained by a change in the engine configuration, while abrupt variations of the indicator illustrated in FIGS. 3 and 4 can be explained by two successive replacements of an engine module, that is, its generator, such information being stored and especially timestamped in base 14. The probable causes identified by this analysis are listed and transmitted by third unit 36 to authorized users. Further, the time signatures may also be associated with identified failures. A maintenance operation is thus prescribed by third unit 36. Simultaneously, said unit also emits an alarm signal.

It should be noted that the storage of the history of configuration changes, of the maintenances applied, and of the working condition indicators enables to perform analyses taking into account the complexity of a helicopter engine. Indeed, as previously described, a helicopter engine is a hypercritical system having its operation influenced by all the maintenance operations and working conditions that it has undergone. Particularly, the working condition of an engine does not only depend on the last maintenance operation applied or on the last configuration modification. Thus, a maintenance operation, or a configuration modification, coupled to an older operation, may cause an untimely event, which can only be detected by an analysis according to the histories stored in database 14.

Further, in the case where the event detected by third unit 36 is a failure, or after the manual input of the data characteristic of a failure by a user, third unit 36 implements an algorithm of identification of the probable causes of the failure according to the maintenance operations applied, to the instantiated engine configuration, to the working condition indicators, and to the authorized configuration modifications.

Figure 4:
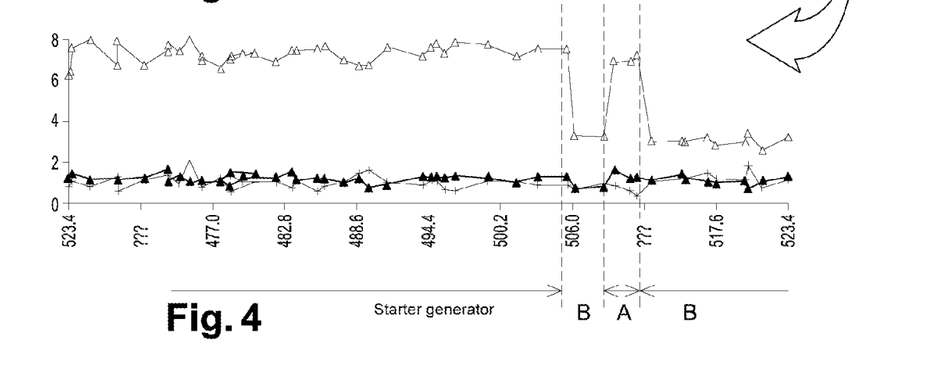
Figure 5:
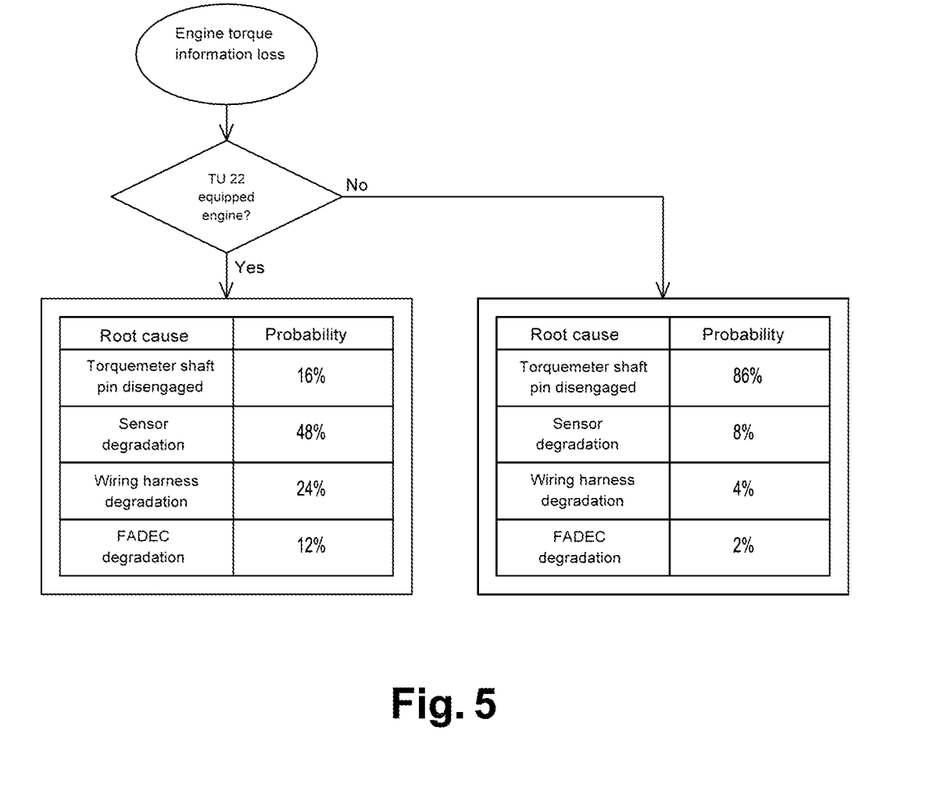
FIGS. 5 and 6 are examples of a probability tree used for the identification of probable failure causes.
Figure 6:
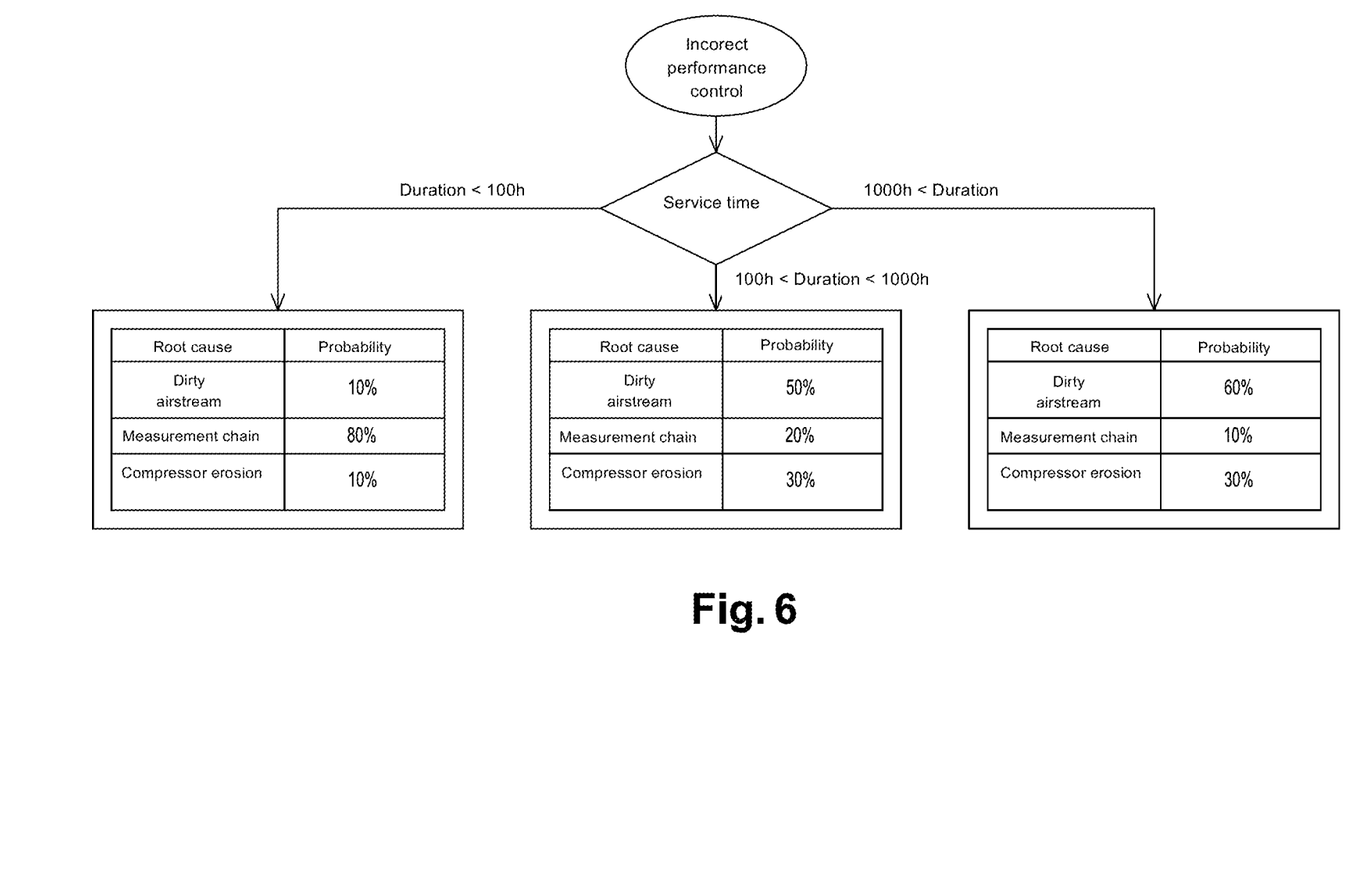

Particularly, the data relating to possible failure causes in database 14 are organized in the form of a probability tree. Two simple examples of probability trees are illustrated in FIGS. 4 and 5, FIG. 4 illustrating probable causes of a loss of information from an engine torque sensor, and FIG. 5 illustrating probable causes of an engine performance loss. The probability tree is examined particularly according to the instantiated engine configuration and browsed by means of a Bayesian-type algorithm. Third unit 36 transmits at the end of its analysis a list of probable causes of the failure, preferably with a probability associated with each of them, as well as an associated maintenance prescription. At the same time, third unit 36 transmits an alarm signal. It should be noted that the trees illustrated in FIGS. 4 and 5 are very simple and that, in practice, the number of possible configurations being very large, the probability tree is also complex.

Finally, processing units 20 comprise a fourth alarm management unit 40 which receives alarm signals from the other units. Alarm management unit 40 keeps up to date a list of alarm signals associated with each alarm-generating event, as well as a list of actions to be taken on database 14 to deactivate the alarms.

Particularly, an alarm is deactivated when a maintenance operation has been performed by a maintenance operator and that he/she has downloaded, with a digital signature, the description and the timestamping of the maintenance operation or the change of configuration that he/she has performed. Preferably, in case of a failure, the alarm is deactivated when the operator also fills in, with a digital signature, the information relating to the failure that he/she has identified, which enables, by recompiling the data relative to possible failure causes, to refine said data. In a variation of the invention, unit 40 may also block any operation on the data of base 14 relative to an engine as long as the description of the maintenance operation or of the configuration change on the engine has not been downloaded.

The invention claimed is:

1. A system for prescribing maintenance of helicopter engines belonging to the same engine class and formed by elements that vary over time depending on the technical condition thereof, the standard replacement of parts between engines, and the replacement of parts with different parts, comprising:
    a centralized database storing operational data relating to:
    working condition, describing the history of one or more working condition indicators of each of the engines;
    possible modifications and authorized modifications of the engines;
    a definition of maintenance plans for the engines according to predetermined values of the working condition indicator(s);
    a description of the probable causes of unscheduled events according to the data relating to possible and authorized modifications and the working condition data;
    maintenance applied, describing the history of maintenance operations applied to each of the engines;
    instantiated configurations, describing the history of the configuration modifications applied to each of the engines;
    means for acquiring the working condition indicator(s) of each of the engines and for updating the working condition data depending on the acquired value of the indicator(s) of each engine;
    means for identifying a maintenance operation to be applied to each of the engines depending on the operational data in the database;
    means for generating a continuous alarm for each identified maintenance operation to be performed;
    means for a digitally-signed updating of the applied maintenance data and the instantiated configuration data according to each maintenance operation applied to each of the engines; and
    means for deactivating an activated alarm if at least the digitally-signed update of the data resulting from the identified applied maintenance operation associated with the alarm is carried out.

2. The system of claim 1, wherein the means for identifying the maintenance operation to be applied comprise:
    means for identifying a condition for triggering a maintenance operation by comparing working condition data of each engine with a time signature base of the centralized database, characteristic of events triggering a maintenance operation;
    means for analyzing the data relating to maintenances applied and instantiated configurations according to the possible and authorized engine modification data and to the working condition data to identify whether one or several maintenance operations applied prior to the occurrence of the triggering condition may have influenced the occurrence thereof; and
    means for transmitting information relative to the identified maintenance operation to be applied and the identified maintenance operation(s) applied.

3. The system of claim 2, wherein the identification means to be applied comprise:
    means for solving unscheduled events, triggered when the identified triggering condition is characteristic of an unscheduled event, and identifying possible causes of the unscheduled event according to the applied maintenance operation data, to the instantiated configuration data, to the working condition data, and to the data relating to the description of probable causes, and to the data relative to authorized configuration modifications; and
    means for transmitting information relative to the identified probable causes.

4. The system of claim 2, comprising means of digitally-signed update of data describing probable causes of unscheduled events according to the causes identified for each unscheduled event and wherein the deactivation means are capable of deactivating an alarm associated with an unscheduled event if the data describing probable causes of unscheduled events are updated according to the identified cause of the event.

5. The system of claim 2, comprising tendency analysis means capable of analyzing the engine working condition data and of modifying the maintenance plan definition data according to said analysis.

6. The system of claim 1, comprising means of digitally-signed update of data describing probable causes of unscheduled events according to the causes identified for each unscheduled event and wherein the deactivation means are capable of deactivating an alarm associated with an unscheduled event if the data describing probable causes of unscheduled events are updated according to the identified cause of the event.

7. The system of claim 6, comprising tendency analysis means capable of analyzing the engine working condition data and of modifying the maintenance plan definition data according to said analysis.

8. The system of claim 1, comprising tendency analysis means capable of analyzing the engine working condition data and of modifying the maintenance plan definition data according to said analysis.

9. The system of claim 1, wherein the identification means to be applied comprise:

means for identifying a condition for triggering a maintenance operation by comparing working condition data of each engine with a time signature base of the centralized database, characteristic of events triggering a maintenance operation;

means for solving unscheduled events, triggered when the identified triggering condition is characteristic of an unscheduled event, and identifying possible causes of the unscheduled event according to the applied maintenance operation data, to the instantiated configuration data, to the working condition data, and to the data relating to the description of probable causes, and to the data relative to authorized configuration modifications; and means for transmitting information relative to the identified probable causes.

10. The system of claim 9, comprising tendency analysis means capable of analyzing the engine working condition data and of modifying the maintenance plan definition data according to said analysis.

11. A method of prescribing maintenance of helicopter engines belonging to the same engine class and formed by elements that vary over time depending on the technical condition thereof, the standard replacement of parts between engines, and the replacement of parts with different parts, comprising:

storing operational data relating to: working condition, describing the history of one or more working condition indicators of each of the engines, possible modifications and authorized modifications of the engines, a definition of maintenance plans for the engines according to predetermined values of the working condition indicator(s), a description of the probable causes of unscheduled events according to the data relating to possible and authorized modifications and to the working condition data, maintenance applied, describing the nature and history of maintenance operations applied to each of the engines, and instantiated configurations;

describing the nature and the history of the configuration modifications applied to each of the engines;

acquiring the working condition indicator(s) of each of the engines and updating the working condition data depending on the acquired value of the indicator(s) of each engine;

identifying a maintenance operation to be applied to each of the engines depending on the operational data in the database;

generating a continuous alarm for each identified maintenance operation to be performed;

updating with digital signature the applied maintenance data and the instantiated configuration data according to each maintenance operation applied to each of the engines;

deactivating an activated alarm if at least the digitally-signed update of the data resulting from the identified applied maintenance operation associated with the alarm is carried out;

maintenance procedure data describing a maintenance procedure for each maintenance plan according to the possible and authorized configurations on the engine class;

means for identifying a maintenance plan to be carried out or a failure to be repaired on each of the engines according to the value of the working condition indicators and to the definition data;

means of description of a maintenance procedure according to the data of the identified maintenance operation and to the instantiated configuration data.

* * * * *